US009797751B2

(12) United States Patent
Dolsak et al.

(10) Patent No.: US 9,797,751 B2
(45) Date of Patent: Oct. 24, 2017

(54) ENCODER READHEAD

(75) Inventors: Gregor Dolsak, Velike Lasce (SI); Aljaz Ogrin, Ljubljana (SI); Matjaz Janezic, Smartno pri Litiji (SI)

(73) Assignees: RLS MERILNA TEHNIKA D.O.O., Dobrunje (SI); RENISHAW PLC, Wotton-under-Edge (GB)

( * ) Notice: Subject to any disclaimer, the term of this patent is extended or adjusted under 35 U.S.C. 154(b) by 203 days.

(21) Appl. No.: 13/203,917

(22) PCT Filed: Mar. 1, 2010

(86) PCT No.: PCT/GB2010/000366
§ 371 (c)(1),
(2), (4) Date: Aug. 30, 2011

(87) PCT Pub. No.: WO2010/100409
PCT Pub. Date: Sep. 10, 2010

(65) Prior Publication Data
US 2011/0316527 A1    Dec. 29, 2011

(30) Foreign Application Priority Data

Mar. 2, 2009 (GB) .................................. 0903535.3

(51) Int. Cl.
*G01R 33/00* (2006.01)
*G01D 5/249* (2006.01)

(52) U.S. Cl.
CPC .................................. *G01D 5/2492* (2013.01)

(58) Field of Classification Search
CPC ........ G01R 33/00; G01R 22/00; G01D 5/249; G01D 5/2492
(Continued)

(56) References Cited

U.S. PATENT DOCUMENTS 4,009,377 A    2/1977 Elms
4,595,991 A *  6/1986 Spies ................................. 33/12
(Continued)

FOREIGN PATENT DOCUMENTS

CN    101290220 A    10/2008
DE    39 42 625 A1    6/1990
(Continued)

OTHER PUBLICATIONS

International Search Report issued in International Patent Application No. PCT/GB2010/000366 dated Jun. 29, 2010.
(Continued)

*Primary Examiner* — Son Le
*Assistant Examiner* — Brent J Andrews
(74) *Attorney, Agent, or Firm* — Oliff PLC (57) ABSTRACT

A readhead is provided for reading an absolute scale, optionally a passive magnetic scale, that encodes a series of data bits. The readhead includes a plurality of sensors, such as an array of Hall sensors, for producing a plurality of sensor signals. A plurality of signal combiners are also provided to receive at least two of the sensor signals and produce therefrom a combined sensor signal. A plurality of data bit extractors are arranged to receive at least two combined sensor signals and to determine the value of a data bit encoded in an associated absolute scale. The readhead also comprises an incremental signal generator for generating at least one incremental signal from the combined sensor signals produced by a plurality of the signal combiners. In this manner, both absolute and incremental position is measured.

23 Claims, 4 Drawing Sheets

(58) Field of Classification Search
USPC ......... 324/200, 207.11, 207.24; 33/705–708; 702/94, 127, 150; 250/234; 356/614–617
See application file for complete search history.

(56) References Cited

U.S. PATENT DOCUMENTS

| | | | |
|---|---|---|---|
| 4,949,289 | A | 8/1990 | Stephens et al. |
| 6,127,948 | A | 10/2000 | Hillis et al. |
| 6,158,132 | A | 12/2000 | Kofink et al. |
| 6,874,244 | B2* | 4/2005 | Birrer et al. ................... 33/708 |
| 7,089,678 | B2 | 8/2006 | Novak et al. |
| 7,148,817 | B2 | 12/2006 | Muller |
| 7,183,535 | B2 | 2/2007 | Velikotny et al. |
| 7,461,464 | B2 | 12/2008 | Mittmann et al. |
| 7,499,827 | B2* | 3/2009 | Gordon-Ingram ............ 702/150 |
| 2003/0145479 | A1* | 8/2003 | Mayer ................ G01D 5/24461 33/707 |
| 2004/0216320 | A1 | 11/2004 | Birrer et al. |
| 2005/0060905 | A1* | 3/2005 | Novak ................ G01D 5/2495 33/706 |
| 2005/0072016 | A1 | 4/2005 | Strasser et al. |
| 2005/0258822 | A1* | 11/2005 | Hara et al. ................. 324/207.2 |
| 2006/0071818 | A1* | 4/2006 | Muller ................ G01D 5/2497 341/15 |
| 2007/0256313 | A1* | 11/2007 | McAdam ............. G01D 5/2451 33/706 |
| 2008/0257951 | A1 | 10/2008 | Mayer et al. |
| 2009/0027692 | A1* | 1/2009 | Zwilling et al. .............. 356/617 |

FOREIGN PATENT DOCUMENTS

| | | |
|---|---|---|
| DE | 42 09 629 A1 | 10/1992 |
| DE | 195 18 664 C1 | 5/1996 |
| DE | 19518664 C1 * | 5/1996 |
| EP | 1 653 625 A2 | 5/2006 |
| EP | 1 983 308 A1 | 10/2008 |
| EP | 1983308 A1 * | 10/2008 |
| JP | A-04-301927 | 10/1992 |
| JP | A-2003-247866 | 9/2003 |
| JP | A-2004-286662 | 10/2004 |
| JP | A-2007-218907 | 8/2007 |

OTHER PUBLICATIONS

Written Opinion issued in International Patent Application No. PCT/GB2010/000366 dated Jun. 29, 2010.
British Search Report issued in British Application No. 0903535.3 dated Aug. 26, 2009.
Jul. 2, 2013 Office Action issued in Japanese Patent Application No. 2011-552498 (with translation).
Sep. 12, 2013 Office Action issued in Chinese Patent Application No. 201080010461.7 (with translation).

* cited by examiner

ENCODER READHEAD

The present invention relates to encoder apparatus and in particular to an encoder readhead for reading a passive magnetic scale track which encodes absolute data.

Various magnetic encoder systems are known in which the varying magnetic properties of an associated scale are read by a readhead that comprises one or more magnetic (e.g. Hall) sensors. Such magnetic encoder systems allow the absolute position, or an incremental change in position, of a scale relative to the readhead to be measured.

An example of an absolute position magnetic encoder is described in U.S. Pat. No. 7,148,817 and one application of such an encoder for elevator installations is outlined in U.S. Pat. No. 6,874,244. The magnetic encoder of U.S. Pat. No. 7,148,817 comprises an active magnetic scale formed from a series of magnets or magnetised regions of alternating (north/south) polarity that encode data bits of information using a so-called Manchester code. A readhead is provided to read the data bits of information encoded in the scale thereby extracting data words from which the absolute position of the readhead relative to the scale can be determined.

The readhead of U.S. Pat. No. 7,148,817 comprises code scanning sensors (i.e. five spaced apart Hall sensor pairs) for extracting data bits of the absolute code from the magnetic scale. The signal generated by each code scanning sensor is compared to a threshold to determine if a north (N) or south (S) magnetic pole is present in the magnetic scale adjacent that sensor. Six additional Hall sensors (so-called fine interpolation sensors) are provided adjacent the code scanning sensors to provide a so-called interpolated or incremental signal. The most significant bit (MSB) of the interpolation signal is used to select which sensor of each Hall sensor pair is appropriately aligned with the magnetic data bits of the scale. The interpolation signal also provides higher resolution position information than can be achieved by reading the absolute data bits alone. Optical absolute position encoders are also known; an example of such an optical encoder is described in US2003/0145479.

According to a first aspect of the present invention, there is provided a readhead for reading an absolute scale encoding a series of data bits, the readhead comprising; a plurality of sensors for producing a plurality of sensor signals; a plurality of signal combiners, each signal combiner arranged to receive at least two of the sensor signals and produce therefrom a combined sensor signal; and a plurality of data bit extractors, wherein each data bit extractor is arranged to receive at least two combined sensor signals and to determine the value of a data bit encoded in an associated absolute scale, characterised in that the readhead comprises an incremental signal generator for generating at least one incremental signal from the combined sensor signals produced by a plurality of the signal combiners.

The present invention thus provides an absolute position readhead for an encoder system that comprises multiple, spaced apart, sensors. Advantageously, the readhead is provided for reading an absolute magnetic scale. Preferably, the plurality of sensors comprises a plurality of magnetic (e.g. Hall) sensors that each generate a sensor signal indicative of measured magnetic field strength. In such an example, the sensor signals may, for example, be voltage signals that indicate the strength of the magnetic field at each respective magnet sensor. A plurality of signal combiners are also provided to receive at least some, and preferably all, of the plurality of sensor signals and to produce from such signals (e.g. by adding and/or subtracting selected sets of sensor signals to/from one another) a plurality of combined sensor signals. Various suitable signal combiner arrangements are outlined in more detail below.

In order to extract the value of data bits encoded in the associated absolute (e.g. magnetic) scale, a plurality of data bit extractors are also provided. Each data bit extractor receives at least two of the combined sensor signals and determines a data bit value. As described in more detail below, each data bit extractor may be a signal selector that determines the value of the associated data bit by comparing a selected one of the combined sensor signals it receives to a predetermined threshold. The data bits extracted by the plurality of data bit extractors preferably provide a codeword that defines an absolute position on the associated absolute scale. In other words, the plurality of data bit extractors conveniently provide a measure of the absolute position of the readhead relative to the associated absolute scale.

Unlike encoders of the type described in U.S. Pat. No. 7,148,817, a readhead of the present invention does not separately compare the signal produced by each (e.g. magnetic) sensor to a threshold and thereafter select which set of digital data bits are suitable for extracting a codeword from the scale. Instead, the present invention uses the plurality of signal combiners to merge (e.g. add/subtract) the sensor signals from multiple (e.g. magnetic) sensors and selectively uses the resulting combined sensor signals to determine data bits that collectively provide absolute position information. The readhead of the present invention has been found to offer improved absolute data extraction reliability compared to devices of the type described in U.S. Pat. No. 7,148,817 whilst the combined sensor signals can also be used to generate an incremental position signal. The present invention thus also obviates the need for the additional magnetic sensors that are required to measure incremental position in devices of the type described in U.S. Pat. No. 7,148,817 thereby allowing a more compact readhead to be provided.

The readhead of the present invention also comprises an incremental signal generator. The incremental signal generator preferable generates at least one incremental signal from the combined sensor signals produced by a plurality of the signal combiners. All, or just some, of the combined sensor signals produced by the plurality of the signal combiners are used to generate the at least one incremental signal. The at least one incremental signal may comprise a signal or signals indicative of the relative position or phase of the (e.g. magnetic) sensors of the readhead relative to the magnetic markings of the associated scale. Such incremental signal(s) preferably allow, for example using an interpolation process of the type described below, the relative position of the readhead and scale to be determined to a resolution less than one bit length of the associated absolute scale.

Advantageously, the incremental signal generator applies a weighting to the plurality of combined sensor signals when generating the at least one incremental signal. In particular, the incremental signal generator may weight the relative contribution of the different combined sensors signals that are used to generate each of the one or more incremental signals. The applied weighting may reduce the contribution of combined sensor signals derived from sensors near the edge of an array of sensors. In other words, the combined sensor signals derived from sensors near the middle of an array of sensors are preferably given a higher weighting than those derived from sensors near the edge of the array. The applied weighting may take the form of a window function. For example, a Hamming, Hann, Gauss or triangular window function may be used. Weighting of combined sensor signals in this manner has been found to reduce the subdivisional error (SDE) when interpolating the resulting incremental signal; this improvement arises from the reduced effect of higher order harmonics.

Advantageously, the at least one incremental signal comprises a pair of quadrature phase signals. For example, the at least one incremental signal may comprise a pair of (periodic) sine/cosine signal. Such sine/cosine signals may be produced using the schemes defined in equations (4) and (5) or in equations (6) and (7) below.

The present invention thus uses the combined sensor signals not only for analysis by data bit extractors to extract absolute data bit values, but to also generate incremental information. In such an arrangement, sensors signals from common (e.g. magnetic) sensors are used to provide both the incremental and absolute position measurements. This is advantageous over encoder systems of the type described in U.S. Pat. No. 7,148,817 in which separate arrays of (differently spaced) Hall sensors are used to acquire the absolute and incremental measurements. A readhead of the present invention, by virtue of being able to use the sensors signals produced by all of the (e.g. magnetic) sensors, can also generate an at least one incremental signal of improved quality compared with that which can be obtained when using a limited number of dedicated, incremental, Hall sensors as described in U.S. Pat. No. 7,148,817. The present invention is also advantageous over systems of the type described in US2003/0145479 that require additional optical sensors to generate the incremental signals and in which separate circuitry is used to generate the absolute and incremental position data from the sensor signals.

The at least one incremental signal may be interpolated to provide interpolated position information having a finer resolution than the bit length of the associated absolute magnetic scale. Advantageously, a first interpolator or interpolator unit is provided for interpolating the at least one incremental signal to provide a first interpolated signal. This first interpolated signal may provide low resolution, or rough, relative position information. For example, the first interpolated signal may take one of four possible states and thereby indicate the relative position of the readhead and scale to a resolution of one quarter of the bit length of the absolute scale.

As outlined above, each data bit extractor receives at least two combined sensor signals. More preferably, each data bit extractor receives at least four combined sensor signals. Preferably, each data bit extractor determines a data bit value by analysis of a selected one of the at least two combined sensor signals it receives. Each data bit extractor may analyse the selected combined sensor signal by comparing it to a threshold as described below.

Advantageously, each data bit extractor selects the combined sensor signal to be analysed based upon a received input that indicates the alignment of the plurality of sensors within the readhead relative to the data bits encoded in the associated scale. Advantageously, each data bit extractor receives the first interpolated signal (i.e. from the first interpolator) and selects which one of the combined sensor signals to analyse based on that first interpolated signal. In other words, the rough phase or relative position information provided by the first interpolator allows each data bit extractor to select which one of the combined sensor signals it receives contains information from sensors that are appropriately aligned relative to the absolute scale. The necessary data bit value can then be extracted from the appropriately aligned combined sensor signal.

It should be noted that each data bit extractor may generate binary data bits or multi-level data bits from an appropriately encoded absolute (e.g. magnetic) scale. Preferably, each data bit extractor is arranged to determine a binary data bit. The data bit value read by each data bit extractor may thus comprise a binary data value (e.g. a logical "1" or "0") dependent upon which side of a threshold the combined sensor signal lies. Each data bit extractor may comprise a data bit output line to output the data bit value.

In addition to, or instead of, the first interpolator mentioned above, a second interpolator or interpolator unit may be provided for interpolating the at least one incremental signal to provide a second interpolated signal. If a first interpolator is also provided, the second interpolator may use a higher interpolation factor than the first interpolator thereby providing finer or higher resolution position information about the relative alignment of the readhead and scale. This finer resolution interpolated position information may be combined with absolute position information to provide a higher resolution (e.g. sub-bit length) measure of absolute position.

Absolute position information may be provided directly by the plurality of data bits generated by the data bit extractors. Conveniently, the data bits generated by the plurality of data bit extractors provide a unique codeword. An absolute position calculation unit may then be provided that comprises a look-up table or other known method to convert such a codeword into an absolute position value. Advantageously, the absolute position calculation unit combines incremental or relative position data from the second interpolated signal with absolute position data from the plurality of data bit extractors. The absolute position calculation unit may thus generate absolute position data having a finer resolution than the bit length of an associated absolute magnetic scale read by the readhead. The absolute position of the scale can thus be determined whenever required, e.g. on power up etc without any requirement to move the scale reader unit relative to the scale.

Conveniently, the plurality of sensors are substantially evenly spaced apart from one another. For example, a regular or periodic array of magnetic sensors may be provided. Such an array preferably comprises a linear array. Other types of sensor (e.g. optical sensing elements) may alternatively be provided if other types of scale (e.g. optical absolute scale) is to be read.

The readhead may be suitable for reading an absolute (e.g. magnetic) scale that comprises a series of data bits, each data bit being of bit length L. In such an example, the plurality of (e.g. magnetic) sensors of the readhead are conveniently spaced apart so as to provide M sensors per bit length L. M is preferably an integer value. Advantageously, M has a value of at least two, even more preferably at least four and even more preferably at least eight. Preferably, M takes a value of four or a value that is a multiple of four.

The readhead is advantageously suitable for reading an absolute (e.g. magnetic) scale that comprises a series of codewords formed from N data bits, wherein N is an integer value of two or more. In such an example, the readhead preferably comprises J sensors, wherein J is greater than or equal to the product of N and M. In other words, enough sensors are preferably provided to simultaneously read at least N data bits from the associated absolute scale. To ensure a codeword can be read irrespective of the alignment of the scale and readhead, it is preferred that the number of sensors, J, is greater than the product of N and M. For example, J may equal the product of N and M plus an integer of, say, 3.

The absolute scale may encode the required codewords in various different ways. The codewords may, for example, be discrete (non-overlapping) or overlapping unique codewords formed from N adjacent bits. A Manchester code, a pseudo-random code or any other known type of absolute coding may be provided. Each codeword, may be at least 2 bits long, more preferably at least 4 bits long, more preferably at least 8 bits long, more preferably at least 10 bits long and more preferably at least 13 bits long. As mentioned above, the readhead may comprise an absolute position calculation unit that may include a look-up table or other means for converting codewords read from the absolute scale into absolute position values.

Advantageously, the readhead comprises at least 4 sensors, more preferably at least 8 sensors, more preferably at least 16 sensors, more preferably at least 20 magnetic and more preferably at least 31 sensors. Preferably, the plurality of sensors comprise a plurality of magnetic sensors. Advantageously, the plurality of magnetic sensors comprises a plurality of Hall sensors. For example, each magnetic sensor may comprise a Hall effect magnetic field sensing element that generates an output or Hall sensor signal. The magnetic sensors may be provided or formed on a common substrate, such as a silicon wafer.

Each signal combiner may produce a combined sensor signal from at least two of the sensor signals in various ways. For example, the sensor signals may be added and/or subtracted from one another using signal combiners in the form of the summing devices described in detail below. In such an example, each combined sensor signal is a summed signal. The plurality of signal combiners may act on mutually exclusive sets of sensor signals. Advantageously, the set of at least two sensor signals received by each signal combiners is different, but overlapping.

Advantageously, the combined sensor signal generated by each signal combiner is derived from the difference between a pair of sensor signals produced by a selected pair of the plurality of sensors. Advantageously, each such selected pair of sensors is spaced apart by half the bit length L of the series of data bits of the associated absolute scale. An example of such a scheme for generating combined sensor signals or summed signals is described mathematically in equation (2) below and a suitable electronic circuit for implementing such a scheme is described below with reference to FIG. 7.

Advantageously, each signal combiner generates its combined sensor signal by combining the sensor signals from a plurality of adjacent sensors. Different signal combiners preferably generate their respective combined sensor signals by combining the sensor signals from different sets of adjacent sensors. Preferably, each signal combiner receives sensor signals from a plurality of adjacent sensors that are spread across one bit length L of the associated absolute scale.

Advantageously, the plurality of signal combiners generate a plurality of combined sensor signals (Si) from the plurality of sensor signals (Hi) produced by the plurality of sensors in accordance with the summation scheme provided in equation (3) below. In such an example, the readhead preferably comprises 4N+3 sensors, the sensors being spaced apart so as to provide four sensors per bit length L of the associated absolute scale. A suitable electronic circuit for implementing such a scheme is described below with reference to FIG. 8.

The readhead may comprise a plurality of magnetic sensors. The readhead may be suitable for use with so-called active magnetic scales in which a series of magnetic (north/south) poles provide the required scale markings. Preferably, the readhead is suitable for use with a so-called passive magnetic scale in which the scale markings are provided by local differences in the magnetic permeability of the scale. The readhead preferably comprises a magnet or magnets. The magnet(s) may comprise permanent (e.g. rare earth) magnets and/or electromagnets. Advantageously, the plurality of magnetic sensors of such a readhead are located within the magnetic field produced by the magnet(s). Preferably, the associated scale can be placed adjacent the plurality of magnetic sensors and also within the magnetic field produced by the magnet. In this manner, the variations in the magnetic permeability of the scale alters the magnetic field strength detected by the plurality of magnetic sensors. Passive magnetic scales have the advantage that they will not, unlike active magnetic scales, become demagnetised in use. Passive magnetic scales are thus typically more suited to use in harsh environments. A variety of suitable passive magnetic scales are described in more detail below.

Advantageously, the pitch of the sensors in the readhead is matched to the pitch of the scale markings of the absolute scale that is read by that readhead. An encoder device may thus be provided that comprises a readhead (or scale reader unit) as described herein and an absolute (e.g. magnetic) scale. The absolute scale may comprise a series of data bits of bit length L and the readhead may comprise an integer number of (e.g. magnetic) sensors per bit length L.

Advantageously, the encoder device includes a passive absolute magnetic scale. The passive absolute magnetic scale may comprise a scale member and a plurality of scale markings for encoding a series of data bits. The scale markings preferably have a different magnetic permeability than the scale member. For example, the scale markings may comprise grooves formed in the scale member and/or regions of material of a different magnetic permeability than the scale member.

The passive absolute magnetic scale may comprise scale markings in the form of a plurality of grooves. The presence or absence of a groove at periodically repeating positions along the scale may encode the data bits that provide the absolute position information. Advantageously, the plurality of grooves comprise grooves of at least a first groove type and a second groove type, the magnetic permeability of the passive absolute magnetic scale in the locality of grooves of the first groove type being different than the magnetic permeability of the passive absolute magnetic scale in the locality of grooves of the second groove type. A groove of the first groove type may then indicates a data bit having a first value whilst a groove of the second groove type indicates a data bit having a second value.

The different groove types formed in the scale member may be used to encode different data bit values (e.g. logical "1"s and "0"s) in the scale member. In this manner, each groove of the scale defines a data bit, the data bit taking a first value (e.g. "0") if the groove is of the first groove type and a second value (e.g. "1") if the groove is of the second groove type. A series or sequence of such data bits (i.e. a series of grooves) may be used to form a codeword (i.e. by forming an appropriate pattern of different types of groove) that describes a unique or absolute position on the scale member. A plurality of such codewords can be formed along the scale member. In this manner, absolute position data can be embedded in the scale whilst the generally repeating pattern of grooves allows incremental position data to be measured by the readhead.

The absolute magnetic scale could be a linear, or flat, scale. Preferably, the absolute magnetic scale comprises a rod. Advantageously, the scale member of the scale comprises a rod or a wire having a substantially circular cross-section. A plurality of grooves may conveniently extend circumferentially around the rod or wire. Providing a scale member of the present invention in the form of rod (e.g. a steel rod) allows its use in a hydraulic cylinder or the like.

Advantageously, the midpoints of the plurality of grooves of the scale are substantially equidistantly spaced apart along the length of the scale member. In this manner, a repetitive pattern of grooves is formed on the scale member from which incremental (Sin/Cos) signals can be extracted. Preferably, grooves of the first groove type have a different depth than grooves of the second groove type. Advantageously, grooves of the first groove type have a different width than grooves of the second groove type. Conveniently, grooves of the first groove type have a different cross-sectional profile than grooves of the second groove type. In other words, grooves of the first groove type have a different influence on an applied magnetic field than grooves of the second groove type thus allowing the different groove types to be sensed.

Conveniently, the magnetic scale comprises a plurality of binary data bits. A groove of the first groove type may defines a binary data bit having a logical "1" value. A groove of the second groove type may then define a binary data bit having a logical "0" value. The logical value associated with a particular groove type can be arbitrarily selected. In this manner, the different groove types are used to encode binary data. The scale may provide at least one codeword in the form of a binary codeword from a series of at least two (e.g. adjacent) binary data bits. Advantageously, a plurality of such binary codewords are formed from a series of at least two binary data bits. Each binary codeword conveniently describes a unique position on the magnetic scale. In other words, the codewords may provide absolute position information. The codewords may be discrete (i.e. non-overlapping) codewords or may be formed as a pseudo-random code in which the unique codewords overlap.

It should be noted that although the above description refers to first and second groove types that allow binary data to be encoded, the invention could make use of grooves of a third groove type or further groove types. In this manner, each groove could define any one of three or more different states. Such an arrangement could be used to reduce the length of codeword required to define an absolute position.

The scale may comprise a plurality of grooves that are unfilled or empty. In other words, no solid material may be used to fill the grooves. Advantageously, a plurality of grooves are provided that are at least partially filled with one or more materials. Preferably, any material filling the grooves has different magnetic properties to that of the scale member. For example, a non-magnetic material may be used to fill grooves formed in a magnetic (e.g. ferromagnetic) scale member. Preferably, the scale member comprises magnetic material. For example, the scale member may be formed from a ferromagnetic material such as steel.

According to a further aspect of the invention, there is provided a readhead for reading an absolute magnetic scale encoding a series of data bits, the readhead comprising; a plurality of magnetic sensors for producing a plurality of sensor signals; a plurality of signal combiners, each signal combiner arranged to receive at least two of the sensor signals and produce therefrom a combined sensor signal; and a plurality of data bit extractors, wherein each data bit extractor is arranged to receive at least two combined sensor signals and to determine the value of a data bit encoded in an associated absolute scale.

Also described herein is a readhead for reading an absolute (e.g. magnetic) scale in which a series of data bits are encoded, the readhead comprising; a plurality of (e.g. magnetic) sensors for producing a plurality of sensor signals; an absolute position module for determining the value of at least one data bit encoded in an associated absolute scale using at least one of the plurality of sensor signals; and an incremental signal generator for generating at least one incremental signal using at least one of the plurality of sensor signals, wherein at least one sensor signal used by the absolute position module is also used by the incremental signal generator.

There is also described herein a readhead for reading an absolute scale encoding a series of data bits, the readhead comprising; a plurality of sensors for producing a plurality of sensor signals; a plurality of signal combiners, each signal combiner arranged to receive at least two of the sensor signals and produce therefrom a combined sensor signal; and a plurality of data bit extractors, wherein each data bit extractor is arranged to receive at least two combined sensor signals and to determine the value of a data bit encoded in an associated absolute scale. The readhead may include any one or more of the above described features.

It should be noted that the skilled person would be aware of the various ways in which the signals and electronics described herein could be modified to provide the present invention. In particular, the various signals and electronic components producing such signals may comprise digital or analogue electronics as required. For example, the sensors signals, combined sensor signals, and the first and second interpolated signals etc may be provided in a digital and/or analogue form. Although magnetic examples are primarily described herein, it should also be noted that the invention can also be applied to other types of encoder devices, such as optical encoder devices.

The invention will now be described, by way of example only, with reference to the accompanying drawings in which.

Figure 1:
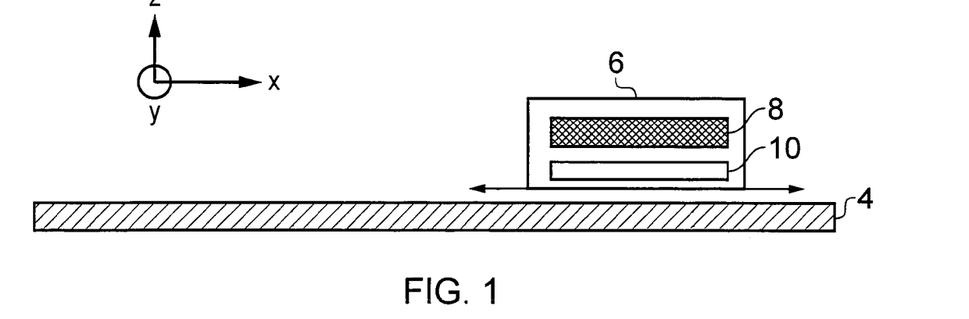
FIG. 1 illustrates a magnetic scale reader unit and a magnetic scale or carrier.

Referring to FIG. 1, an encoder device 2 is schematically illustrated that comprises a ferromagnetic scale or carrier 4 having a series of markers or grooves (not shown) and a magnetic scale reader unit 6. The scale reader unit 6 comprise a permanent magnet 8 and a sensor substrate 10 carrying multiple (e.g. thirty-one) Hall sensors. The Hall sensors are uniformly spaced apart in a line along the x-axis and the sensor substrate 10 is arranged to lie substantially parallel to the scale 4. The scale reader unit 6 also comprises electronic processing circuitry which is not shown in FIG. 1 for clarity.

Figure 2:
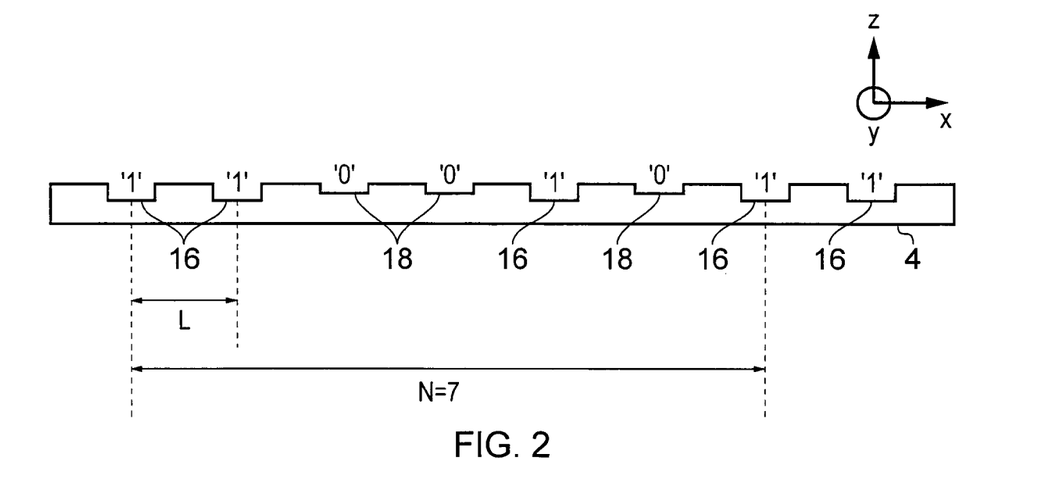
FIG. 2 illustrates a scale having a series of grooves of two different groove depths.

FIG. 2 is an expanded view of a section of the scale 4 that is schematically illustrated in FIG. 1. The scale 4 comprises a substrate formed from ferromagnetic material that includes a series of grooves. The grooves are spaced apart by substantially equal distances along the length of the scale 4. Full depth grooves 16 and reduced (half) depth grooves 18 are formed in the substrate to define different bits of binary data. For example, a full depth groove may define a logical "1" whilst a half depth groove defines a logical "0". The grooves have a bit length L that can be defined as the smallest distance between the centre of two grooves. A binary word (of word length N) can then be built up from an appropriate sequence of N (e.g. seven) full and half depth grooves. The scale 4 thus comprises a series of such words, preferably arranged so that any sub-sequence of bits of the defined word length only appears once on the scale 4. A skilled person would be aware of the numerous technique that could be used to form the grooves; e.g. etching, cutting, laser beam evaporating etc.

Figure 3:
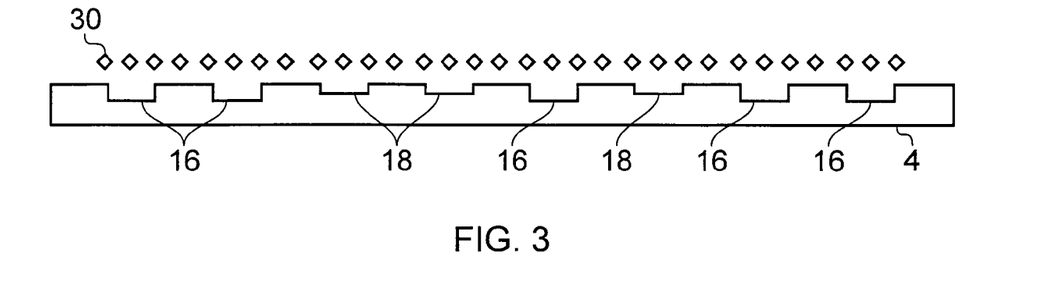
FIG. 3 illustrates thirty-one Hall sensors arranged to read the scale of FIG. 2.

Referring to FIG. 3, the thirty-one Hall sensors 30 of the scale reader unit are illustrated when adjacent a section of the scale 4. The sensors 30 are uniformly arranged in a line and detect variations in the magnetic field of the associated permanent magnet (not shown in FIG. 3) that are caused by the grooves 16 and 18 formed in the substrate. The sensor arrangement shown in FIG. 3 comprises four Hall sensors per bit length L of the scale. For the alignment of the sensors and scale shown in FIG. 3, eight data bits can be read from the scale. The provision of thirty-one Hall elements ensures that at least seven data bits can always be read from the scale (i.e. a whole word in this example) irrespective of the position of the readhead unit relative to the scale. In this manner, absolute position can be measured for any relative position of the scale and scale reader unit.

The electronics of the readhead unit, which are described in more detail below with reference to FIGS. 7 and 8, evaluate the signals from each of the Hall sensors 30. The sequence of different grooves types that are present on the section of scale adjacent the readhead unit can thus be determined allowing a binary data sequence or word to be determined. For the section of scale shown in FIGS. 2 and 3, the readhead unit would thus extract the binary code sequence "1100101". This sub-sequence can then be compared to a look-up table storing information on the location of the various bit patterns on the scale and thus provides a measure of the absolute position of the scale relative to the readhead. The basic resolution of the absolute position determined in this manner equals one bit length (L) and in the best case it can be increased to the spacing of the sensors.

To explain the operation of the readhead, the signal from each of the various Hall sensors can be denoted as;

$$H_i; i=1 \ldots (4 \cdot N+3) \quad (1)$$

where N is the word length of the binary sequence and there are four Hall sensors per bit length (L). Although four Hall sensors per bit length are described in the present example, more or fewer sensors per bit length could be provided.

Absolute position information is extracted from the Hall sensor signals ($H_i$) by firstly generating a plurality of summed signals ($S_i$). Two examples of suitable summation schemes are outlined below, but other summation schemes could be used.

A first example of a summation scheme that can be used to generate summed signals ($S_i$) from the Hall sensor signals ($H_i$) can be described as follows;

$$S_i = H_i - H_{i+2}; i=1 \ldots 4 \cdot N \quad (2)$$

Alternatively, a second summation scheme may be used:

$$S_i = H_i - H_{i+1} - H_{i+2} + H_{i+3}; i=1 \ldots (4 \cdot N) \quad (3)$$

In each example, a series ($S_1$ to $S_{4 \cdot N}$) of summed signals are produced. The binary value of the data bits encoded in the associated scale can then be obtained from the values of an appropriate set of such summed signals. For example, the value of a first absolute data bit may be found from an appropriate one of the summed signal $S_1$-$S_4$, the value of a second absolute data bit may be found from one of the summed signal $S_5$-$S_8$, etc. Extracting absolute data from such summed signals in this manner is described in detail with reference to FIGS. 7 and 8 below.

In addition to extracting absolute data, it has been found that the summed signals ($S_i$) can also generate two periodic (sin/cos) signals that can be used to increase the resolution of the encoder. These signals are analogous to the incremental (quadrature phase) signals produced in incremental systems by directly combining the outputs of the Hall sensors, but are instead extracted from a combination of the summed signals that are used to generate absolute data. It should be noted that, for generating such incremental signals, the second summation scheme of equation (3) is typically preferred as it reduces the effects of any inhomogeneity in the magnetic field of the permanent magnet to a greater extent than the first scheme of equation (2). However, either summation scheme can be used.

The summed signals ($S_i$) produced by either of the above described summation schemes can be used to generate two periodically varying signals (Sin and Cos) that each have a period equal to the bit length (L) via the expressions:

$$\mathrm{Sin} = \sum_{i=1}^{N} w_i \cdot S_{(i-1) \cdot 4+1} - \sum_{i=1}^{N} w_i \cdot S_{(i-1) \cdot 4+3} \quad (4)$$

and $$\mathrm{Cos} = \sum_{i=1}^{N} w_i \cdot S_{(i-1) \cdot 4+2} - \sum_{i=1}^{N} w_i \cdot S_{(i-1) \cdot 4+4} \quad (5)$$

It is also possible to generate such sine and cosine signals from the expressions:

$$\mathrm{Sin} = \sum_{i=1}^{N} w_i \cdot S_{(i-1) \cdot 4+1} \quad (6)$$

and $$\mathrm{Cos} = \sum_{i=1}^{N} w_i \cdot S_{(i-1) \cdot 4+2} \quad (7)$$

The value $w_i$ contained in the above equations (4) to (7) may be set to a constant value (e.g. unity) to provide an unweighted summation of the various summed signals ($S_i$). Alternatively, the value of $w_i$ may be defined by an expression that causes a different weighting to be applied to the various summed signals. It has been found to be particularly advantageous to apply a so-called window function to the summation; this reduces the contribution to the Sin/Cos signals from summed signals that are derived from Hall sensors near the ends of the Hall sensor array. In particular, applying such a window function has been found to reduce higher harmonic contributions to the Sin/Cos signals thereby reducing the sub-divisional error when interpolating those signals. The skilled person would be aware of the numerous window functions that could be applied (e.g. Hann, Gauss, Triangular, Hamming functions etc). In particular, the following Hamming function may be used:

$$w_i = 0.54 - 0.46 \cdot \cos\left(\frac{2\pi \cdot i}{N}\right) \quad (8)$$

The Sin and Cos (i.e. quadrature phase) signals of equations (4) and (5) and of equations (6) and (7) thus provide information about the relative position of the readhead and associated scale. Interpolation of such quadrature phase signals, e.g. using interpolation techniques employed for incremental encoders, can provide positional information having a finer resolution than the bit length. In particular, it has been found that an interpolation factor of up to around 500 can be employed. The Sin and Cos signals described above can thus be used to greatly increase the resolution of the position of the encoder relative to the scale.

The combination of incremental (quadrature phase) and absolute data derived from the same Hall sensor elements reading the same scale track, thus provides a high resolution absolute encoder. The absolute code words provide coarse position information whilst the Sin/Cos signals are interpolated to provide much finer (sub-bit length) resolution. In particular, the interpolated incremental position measurement information is added to coarse absolute position information to provide a resultant (high resolution) absolute position measurement.

The above described method has the advantage of not requiring two discrete tracks of markers. The single track does not, however, have a completely periodic variation in magnetic properties along its length thereby affecting the amplitude of the quadrature phase (Sin and Cos) signals. In other words, the use of full and half depth grooves to encode the absolute position data has an effect on the amplitude of the quadrature phase (Sin and Cos) signals thereby reducing the interpolation factor that can be applied when obtaining the incremental position data.

The scale pattern shown in FIGS. 2 and 3, which comprises full and half depth grooves, has been found to have only a minimal effect on the amplitude of the Sin and Cos signal whilst allowing the different groove types to be readily identified. In particular, the Sin and Cos signals generated when reading such a scale vary in amplitude by no more than 50%.

It should also be noted that varying the groove depth is only one way in which absolute data may be encoded without significantly degrading the Sin and Cos signals.

Figure 4:
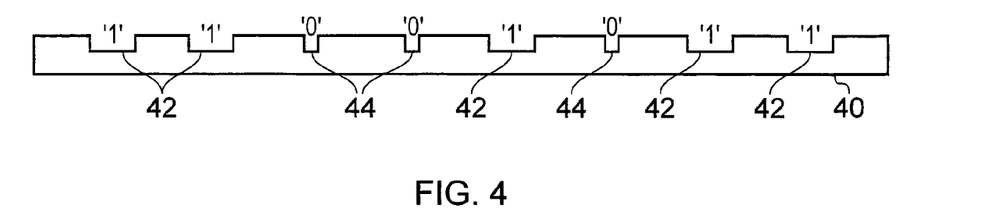
FIG. 4 illustrates a scale having a series of grooves of two different groove widths.

Referring to FIG. 4, an alternative scale 40 is illustrated having a series of grooves having centre points that are regularly spaced along the scale. A full width groove 42 is used to encode, say, a logical "1" whilst a half-width groove 44 is used to encode a logical "0". This arrangement has also been found to result in a variation in the amplitude of the Sin and Cos signals generated when reading such a scale by no more than 50%.

It can thus be seen that the exact form of the different groove types is immaterial. It is simply necessary for the two different types of groove to provide measurably different magnetic properties that can be sensed by the associated readhead whilst degrading the Sin and Cos signals by the least amount possible. The two different types of groove could thus vary in both width and depth. Alternatively, the different groove types could have different cross-sectional profiles that provide the measurable difference in magnetic properties. The different groove types could also be provided by using a plurality of different sub-grooves (e.g. dots or fine lines) or by forming different groove types by infilling grooves with materials of different magnetic permeability. Although a binary arrangement is shown, it would also be possible to provide three or more different types of grooves that could be distinguished from one another. In such a manner, the length of codeword could be reduced.

Figure 5:
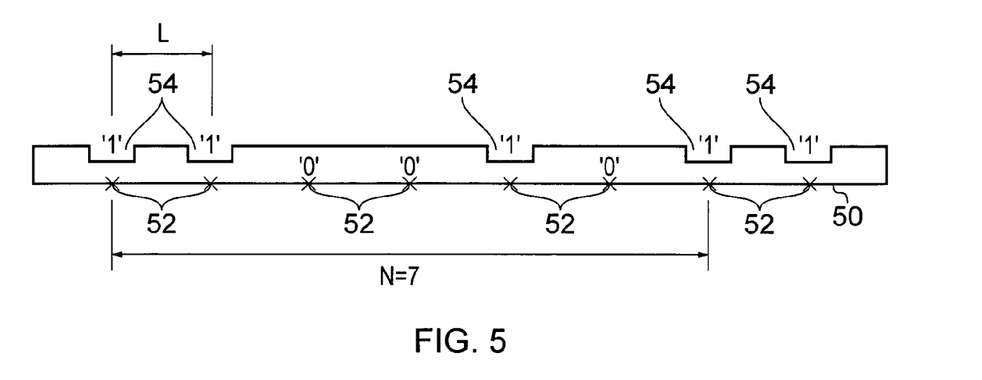
FIG. 5 illustrates a scale in which certain grooves are omitted to define absolute position information.

Referring to FIG. 5, it is also possible to encode the necessary absolute information in the scale by simply omitting grooves from the periodic sequence to encode the absolute data bits. The scale 50 shown in FIG. 5 thus comprises a regular series of potential groove locations 52. A groove 54 formed at such a potential groove location indicates a logical "1" and omission of such a groove indicates a logical "0". It has been found that such an arrangement can be used, without degrading the quadrature phase signals, provided that the sequence of data bits is controlled to prevent too many adjacent zeros being encoded. In such a system, an interpolation factor of around 20-30 can be used.

Figure 6:
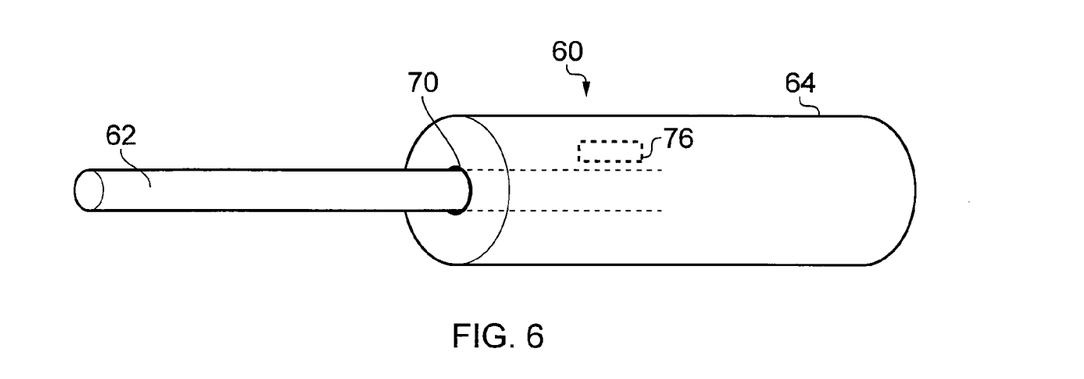
FIG. 6 shows a rod that forms a scale having a series of grooves of two different groove depths.

Referring to FIG. 6, a preferred application of the above described encoder scale arrangement is illustrated. In particular, the use of a single scale track to encode both incremental and absolute position data can be advantageously used to measure the position of pistons in hydraulic cylinders or the like.

FIG. 6 shows a hydraulic cylinder 60 that incorporates a piston rod 62 that is slideable within a pressurised cylinder casing 64. A supply of hydraulic fluid can be pumped into and out of the casing 64 therefore causing the piston to advance and retract relative to the casing 64. A fluid seal 70 is provided on the casing 64 to prevent leakage of hydraulic fluid.

It is desirable to determine the absolute position of the piston rod 62 relative to the casing 64; for example, in case power is momentary lost or on start-up. It is, however, usual for the piston rod 62 to be freely rotatable relative to the casing 64. The use of prior art systems in which incremental and absolute tracks are placed side-by-side can thus be seen to be unsuitable for such an application. In particular, rotation of the piston rod would cause misalignment between the incremental and absolute tracks and their respective readheads.

The piston rod 62 of FIG. 6 is thus provided with circumferentially extending grooves (not shown) that encode a combined absolute/incremental scale of the type illustrated in FIG. 2. A reader unit 76, similar to the reader unit 6 of FIG. 1, can then be placed adjacent the piston rod 62 for reading the absolute position of the rod relative to the cases. These readings are thus unaffected by any piston rod rotation.

It should be noted that the grooves formed in the scale need not be empty or fluid filled. If a magnetic scale substrate is used, the grooves may be filled with a non-magnetic solid material (e.g. copper, chromium, ceramic etc). Providing a non-magnetic scale substrate and magnetic groove fillings would also be possible. Filling the grooves in this manner still provides the necessary variation in magnetic properties but also allows a smooth scale surface to be provided. Providing such a smooth surface is especially advantageous for hydraulic cylinders where a tight fluid seal 70 with the scale carrying piston rod is required.

Figure 7:
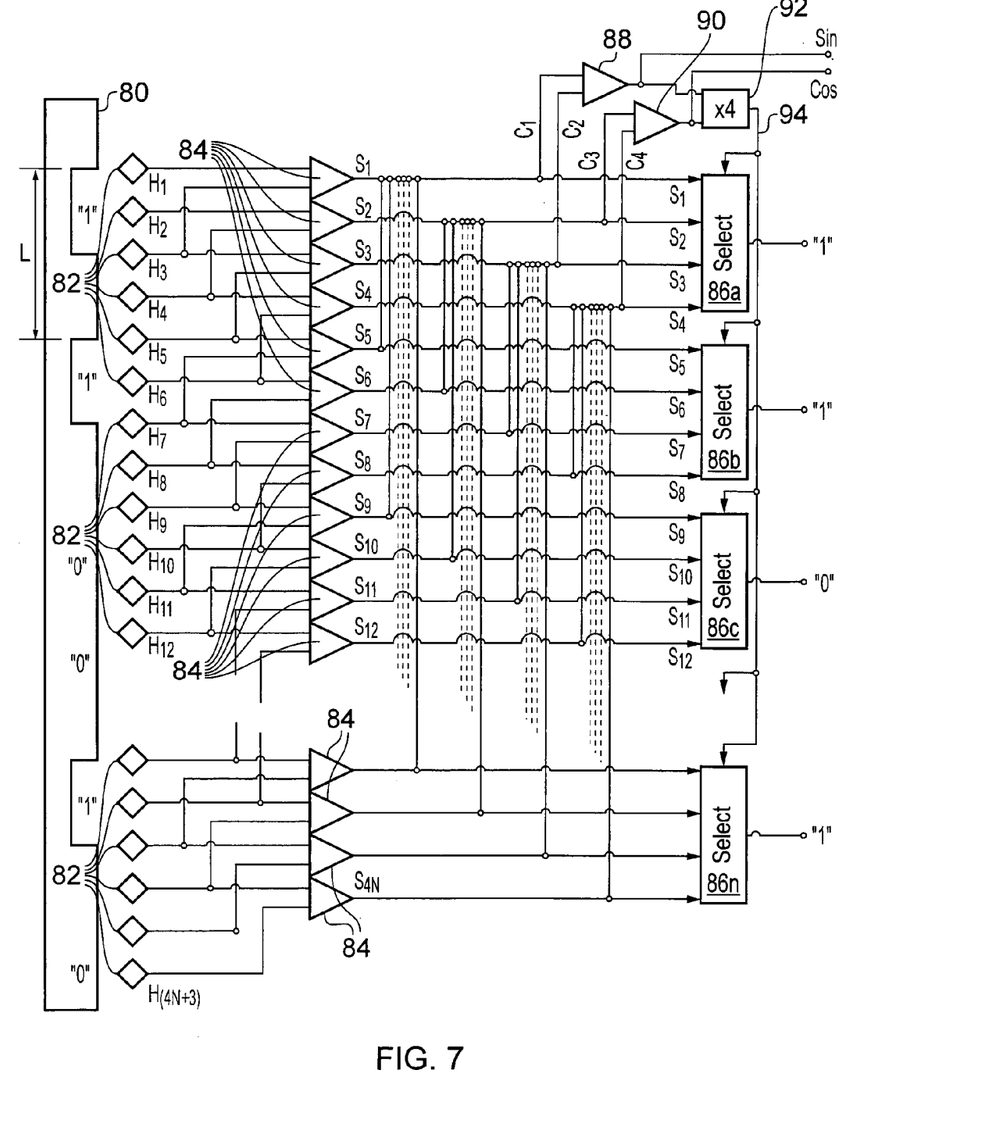
FIG. 7 illustrates a first readhead circuit.
Figure 8:
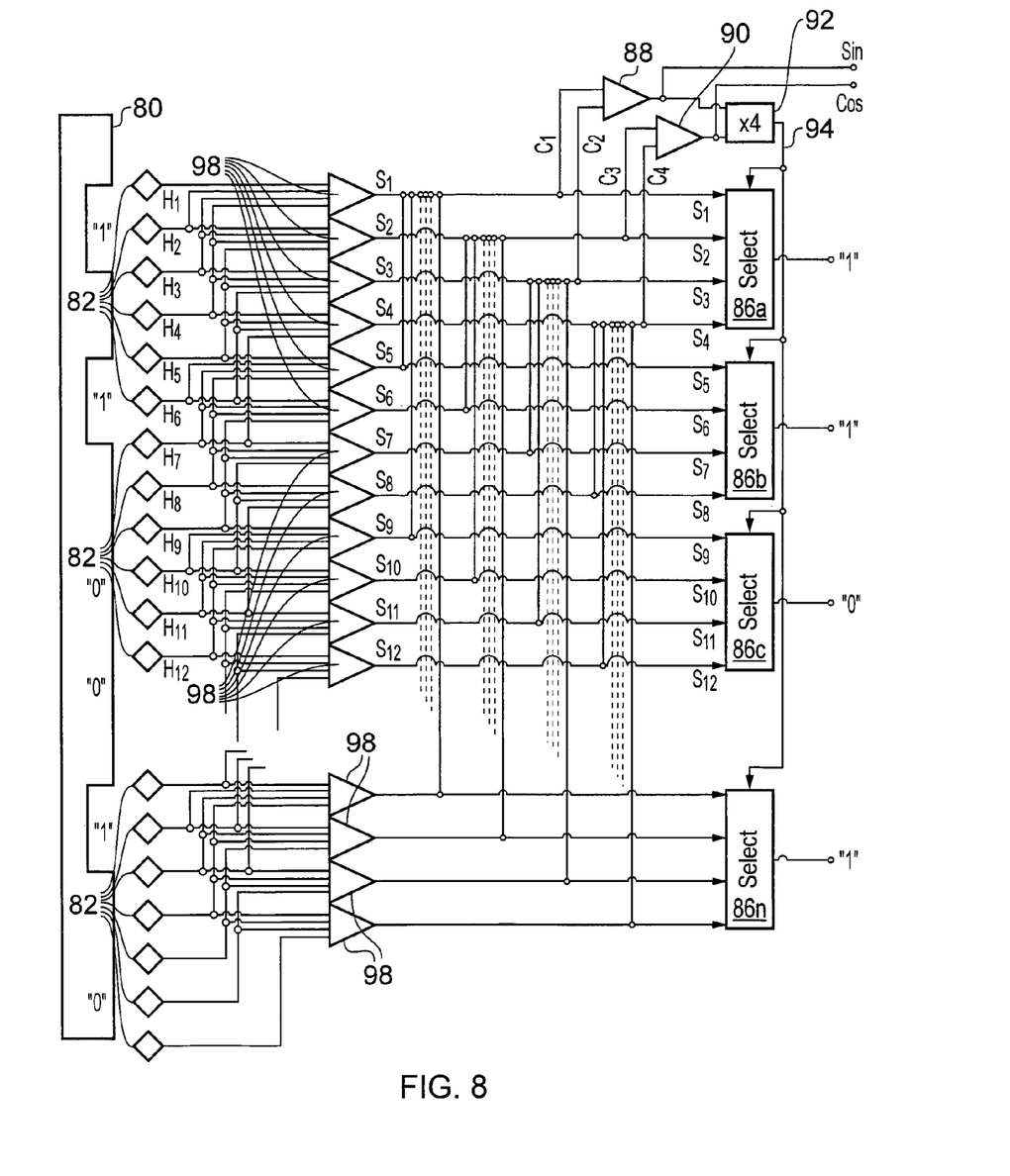
FIG. 8 illustrates a second readhead circuit.

Referring now to FIGS. 7 and 8, the electronic circuitry of scale reader units of the type described with reference to FIG. 3 are illustrated when reading a scale of the type described with reference to FIG. 5.

FIG. 7 illustrates a scale 80 encoding a series of absolute data bits of bit length L. An associated scale reader is also illustrated that comprises a linear array of Hall sensors 82. The Hall sensors 82 are evenly spaced apart from one another and four Hall sensors are provided per bit length L of the scale. Each Hall sensor 82 generates an output signal; these Hall signals can be denoted $H_i$ using the terminology introduced in equation (1) above.

A plurality of summing devices 84 are also provided to generate summed (difference) signals $S_i$ from the Hall sensor output signals $H_i$ as defined in equation (2) above. In particular, it can be seen that the first summed signal $S_1$ is generated from the difference between the first Hall sensor signal $H_1$ and the third Hall sensor signal $H_3$, the second summed signal $S_2$ is generated from the difference between the second Hall sensor signal $H_2$ and the fourth Hall sensor signal $H_4$, etc. In other words, each summed signal S is generated from signals produced by a pair of Hall sensors that are spaced apart by half the bit length.

A plurality of signal selectors 86a-86n (collectively referred to as the signal selectors 86) are provided to receive the summed signals produced by the plurality of summing devices 84. The number of signal selectors 86 is chosen to be equal to the word length that is to be read from the scale. Each signal selector 86 receives four of the summed signals. In particular, the first signal selector 86a receives summed signals $S_1$ to $S_4$, the second signal selector 86b receives signals $S_5$ to $S_8$, the third signal selector 86c receives signals $S_9$ to $S_{12}$ etc. The purpose of each signal selector 86 is to select which one of the four summed signals it receives should be used to determine the presence or absence of a groove in the scale and therefore whether that data bit encodes a logical "1" or "0" value. This selection process, which relies on receipt of the coarse interpolated position signal described below, means that the data encoded in the scale 80 can be read with the scale located in an arbitrary position relative to the array of Hall sensors 82. A parallel series of data bits corresponding to the word encoded in the scale are thus output by the signal selectors 86.

In addition to being used to generate absolute data, the summed signals S are also combined in accordance with equations (4) and (5) or equations (6) and (7) above to generate a pair of sin/cos signals. In other, words, the summed signals $S_i$ used to provide the absolute data information are also used to generate an incremental signal.

In particular, a first combined signal $C_1$ is generated from the sum of every fourth summed signal starting at $S_1$; i.e. $C_1$ is produced by combining summed signals $S_1$, $S_5$, $S_9$, $S_{13}$ etc. A second combined signal $C_2$ is generated from the sum of every fourth summed signal starting at $S_3$ (i.e. the summation of $S_3$, $S_7$, $S_{11}$, $S_{15}$ etc). A third combined signal $C_3$ is generated from the sum of every fourth summed signal starting at $S_2$ (i.e. the summation of $S_2$, $S_6$, $S_{10}$, $S_{14}$ etc). A fourth combined signal $C_4$ is generated from the sum of every fourth summed signal starting at $S_4$ (i.e. the summation of $S_4$, $S_8$, $S_{12}$, $S_{16}$ etc). A first summing device 88 provides a sin signal from the difference between the first and second combined signals $C_1$ and $C_2$ and a second summing device 90 provides a cosine signal from the difference between the third and fourth combined signals $C_3$ and $C_4$.

An interpolator unit 92 receives the sine and cosine signals from the first and second summing devices 88 and 90. The interpolator unit 92 applies an interpolation factor of four and thus outputs a coarse incremental signal 94 that indicates the coarse relative phase of the alignment between the scale 80 and the array of Hall sensors 82 within a phase quadrant (i.e. with a 90° phase range). Each signal selector 86 receives this coarse incremental signal and uses it to determine which one of the four summed signals that it receives is appropriately aligned so as to read the required data bit of the scale. In the example shown in FIG. 7, the summed signal $S_2$ is derived from the difference in magnetic field intensity of the second and fourth Hall sensors (i.e. signals $H_2$ and $H_4$) and thus provides an indication that the scale has a groove encoding logical "1" as a first data bit.

The circuit of FIG. 7 thus outputs N data bits (0s or 1s) that correspond to the data word encoded in the scale 80 plus a pair of sin/cos signals. A look-up table is used to establish the absolute position associated with the N-bit word read from the scale. The sin/cos signals are interpolated to obtain a finer (sub-bit length) measure of the (incremental) position of the scale relative to the Hall sensors 82 within one bit length. If an interpolation factor of, say, 30 is used the relative (incremental) position of the scale relative to the Hall sensors 82 can thus be found to within one thirtieth of the bit length. The (sub-bit length) incremental position is added to the absolute position value thereby providing a higher resolution, absolute, measure of position than would be possible using the absolute data alone. This higher resolution absolute position information may be output using, for example, a serial data transfer protocol.

FIG. 8 illustrates a variant of the circuit of FIG. 7 in which like components are assigned like reference numerals.

The circuit of FIG. 8 is similar to that shown in FIG. 7 but implements the second summation scheme defined in equation (3) above. Instead of using the summing devices 84 of FIG. 7 that provides summed signal $S_i$ from a pair of Hall sensor signals, the circuit of FIG. 8 uses a plurality of alternative summing devices 98 that receive signals from four Hall sensors to provide the summed signals $S_i$. The circuit shown in FIG. 8 is of greater electronic complexity than that shown in FIG. 7, but harmonic distortions of the sin and cos signals resulting from variations in the intensity of the magnetic field generated by the magnet are reduced.

The invention claimed is:

1. A readhead arranged to read an absolute scale encoding a series of data bits, the readhead comprising:
   a plurality of sensors that are each arranged to produce a sensor signal indicative of measured magnetic field strength;
   a plurality of signal combiners, each signal combiner being arranged to receive at least two of the sensor signals produced by the plurality of sensors and to produce therefrom a combined sensor signal, the plurality of signal combiners thereby generating a plurality of combined sensor signals;
   a plurality of data bit extractors for generating absolute position data and arranged to receive the plurality of combined sensor signals, each data bit extractor being arranged to receive at least two of the combined sensor signals and to determine the value of a data bit encoded in an associated absolute scale; and
   an incremental signal generator arranged to receive at least two of the plurality of combined sensor signals also received by the data bit extractors and to generate at least one incremental signal from the at least two combined sensor signals.

2. A readhead according to claim 1 arranged to read an absolute magnetic scale, wherein the plurality of sensors comprise a plurality of magnetic sensors.

3. A readhead according to claim 1, wherein the at least one incremental signal comprises a pair of quadrature phase signals.

4. A readhead according to claim 1, wherein the incremental signal generator applies a weighting to the at least two combined sensor signals when generating the at least one incremental signal.

5. A readhead according to claim 1, comprising a first interpolator arranged to interpolate the at least one incremental signal to provide a first interpolated signal.

6. A readhead according to claim 5, wherein each data bit extractor determines the data bit value by analysis of a selected one of the at least two combined sensor signals received thereby, wherein each data bit extractor receives the first interpolated signal and selects which combined sensor signal to analyse based on the first interpolated signal.

7. A readhead according to claim 1, comprising:
a second interpolator arranged to interpolate the at least one incremental signal to provide a second interpolated signal; and
an absolute position calculation unit arranged to combine incremental position data from the second interpolated signal with absolute position data from the plurality of data bit extractors,
wherein the absolute position calculation unit generates absolute position data having a finer resolution than the bit length of an associated absolute scale read by the readhead.

8. A readhead according to claim 1, wherein the plurality of sensors are substantially evenly spaced apart from one another.

9. A readhead according to claim 1 adapted to read an absolute scale that comprises a series of data bits of bit length L, wherein the plurality of sensors of the readhead are spaced apart so as to provide M sensors per bit length L, wherein M is an integer of two or more.

10. A readhead according to claim 9 adapted to read an absolute scale that comprises a series of codewords formed from N data bits, N being an integer value of two or more, wherein the readhead comprises J sensors, J being greater than or equal to the product of N and M.

11. A readhead according to claim 1, wherein the combined sensor signal generated by each signal combiner is derived from the difference between a pair of sensor signals produced by a selected pair of the plurality of sensors, wherein each such selected pair of sensors is spaced apart by substantially half the bit length L of the series of data bits of the associated absolute scale.

12. A readhead according to claim 1, wherein each signal combiner generates its combined sensor signal by combining the sensor signals from a plurality of adjacent sensors of the plurality of sensors.

13. A readhead according to claim 1, wherein the plurality of sensors comprise a plurality of magnetic sensors and the readhead further comprises a magnet.

14. An encoder device comprising, a readhead according to claim 1 and an absolute scale, wherein the absolute scale comprises a series of data bits of bit length L and the readhead comprises an integer number of sensors per bit length L.

15. An encoder device according to claim 14, wherein the absolute scale comprises a passive absolute magnetic scale comprising a scale member and a plurality of scale markings arranged to encode the series of data bits, wherein the scale markings have a different magnetic permeability than the scale member.

16. An encoder device according to claim 14, wherein the absolute scale comprises a rod.

17. An encoder device comprising:
the readhead according to claim 1; and
an absolute scale encoding a series of data bits.

18. A readhead according to claim 1, wherein the data bit encodes a binary value.

19. A readhead according to claim 1, wherein the data bit is a multi-level data bit.

20. A readhead according to claim 19, wherein the multi-level data bit encodes three different states.

21. A readhead according to claim 1, wherein the at least one incremental signal is received by the plurality of data bit extractors.

22. A readhead arranged to read an absolute scale encoding a series of data bits, the readhead comprising;
a plurality of sensors arranged to produce a plurality of sensor signals;
a plurality of signal combiners, each signal combiner arranged to receive at least two of the sensor signals and to produce therefrom a combined sensor signal, and each signal combiner arranged to receive its combined sensor signal by combining the sensor signals from a plurality of adjacent sensors of the plurality of sensors;
a plurality of data bit extractors, each data bit extractor being arranged to receive at least two combined sensor signals and to determine the value of a data bit encoded in an associated absolute scale; and
an incremental signal generator arranged to generate at least one incremental signal from the combined sensor signals produced by a plurality of the signal combiners,
wherein the plurality of signal combiners are arranged to generate a plurality of combined sensor signals ($S_i$) from the plurality of sensor signals ($H_i$) produced by the plurality of sensors in accordance with the summation scheme:

$$S_i = H_i - H_{i+1} - H_{i+2} + H_{i+3}; \ i=1 \ldots (4 \cdot N)$$

N being the number of data bits in each codeword encoded by the associated absolute scale, the readhead comprising 4N+3 sensors, and the sensors being spaced apart so as to provide four sensors per bit length L of the associated absolute scale.

23. An encoder device comprising:
a passive absolute magnetic scale comprising a scale member and a plurality of scale markings arranged to encode a series of data bits of bit length L, the scale markings having a different magnetic permeability than the scale member,
the plurality of scale markings being a plurality of grooves, the plurality of grooves comprising grooves of at least a first groove type and a second groove type, the magnetic permeability of the passive absolute magnetic scale in the locality of grooves of the first groove type being different than the magnetic permeability of the passive absolute magnetic scale in the locality of grooves of the second groove type, and
a groove of the first groove type indicating a data bit having a first value and a groove of the second groove type indicating a data bit having a second value; and
a readhead arranged to read an absolute scale encoding a series of data bits, the readhead comprising;
a plurality of sensors arranged to produce a plurality of sensor signals, the readhead comprising an integer number of sensors per bit length L,
a plurality of signal combiners, each signal combiner being arranged to receive at least two of the sensor signals and to produce therefrom a combined sensor signal,
a plurality of data bit extractors, each data bit extractor being arranged to receive at least two combined sensor signals and to determine the value of a data bit encoded in an associated absolute scale, and an incremental signal generator arranged to generate at least one incremental signal from the combined sensor signals produced by a plurality of the signal combiners.

* * * * *